STORAGE DEVICES

Filed June 11, 1958

INVENTOR
JOHN R. ANDERSON
BY Louis A Kline
Albert L. Sessler, Jr.
HIS ATTORNEYS 3,021,510

STORAGE DEVICES

John R. Anderson, Dayton, Ohio, assignor to The National Cash Register Company, Dayton, Ohio, a corporation of Maryland Filed June 11, 1958, Ser. No. 741,281
3 Claims. (Cl. 340—173.2)

This invention relates to storage devices, and more particularly relates to shift registers and other storage devices utilizing components of the solid-state type.

There exists at the present time a need in the data-processing field for low-cost and versatile shift registers. The present invention offers means for satisfying this need by using photoconductors, such as cadmium sulfide cells, as switching units in series with ferroelectric storage cells of some suitable material such as barium titanate. The photoconductors can be illuminated by input and shifting pulse light sources. These sources may be in the form of electroluminescent cells, neon glow tubes, or other appropriate means.

Storage devices utilizing pairs of ferroelectric elements are known, as shown, for example, in the copending United States patent application, Serial No. 729,023, filed April 16, 1958, by the present inventor, now United States Patent No. 3,011,157, issued November 28, 1961, and as also shown in the article "A New Type of Ferroelectric Shift Register," which appeared in Transactions of the IRE PGEC, volume EC5, No. 4, December 1956, written by the present inventor. However, neither of the above references contemplated the use of ferroelectric elements in combination with photoconductive cells in the manner disclosed herein, to produce a shift register of extremely simple, yet efficient, design.

Since ferroelectric materials have rectangular hysteresis characteristics, in which there are two remanent conditions of electrical charge (Q) or polarization, in which the cell exhibits substantial cell charge saturation, these elements are bistable, and therefore well suited for storage of information. They may therefore readily be combined to form shift registers, ring counters, etc., in which the state of the ferroelectric elements will be maintained until changed by appropriately applied electrical impulses.

It is accordingly an object of this invention to provide a simple and effective shift register.

Another object is to provide a shift register using storage elements of ferroelectric materials which have bistable characteristics.

Another object is to provide a shift register utilizing a combination of ferroelectric and photoconductive elements.

An additional object is to provide a shift register capable of being fabricated by simple and inexpensive techniques.

With these and incidental objects in view, the invention includes certain novel features of construction and combinations of parts, a preferred form or embodiment of which is hereinafter described with reference to the drawing which accompanies and forms a part of this specification.

Figures 1, 2, 3, 4, 5, 6:
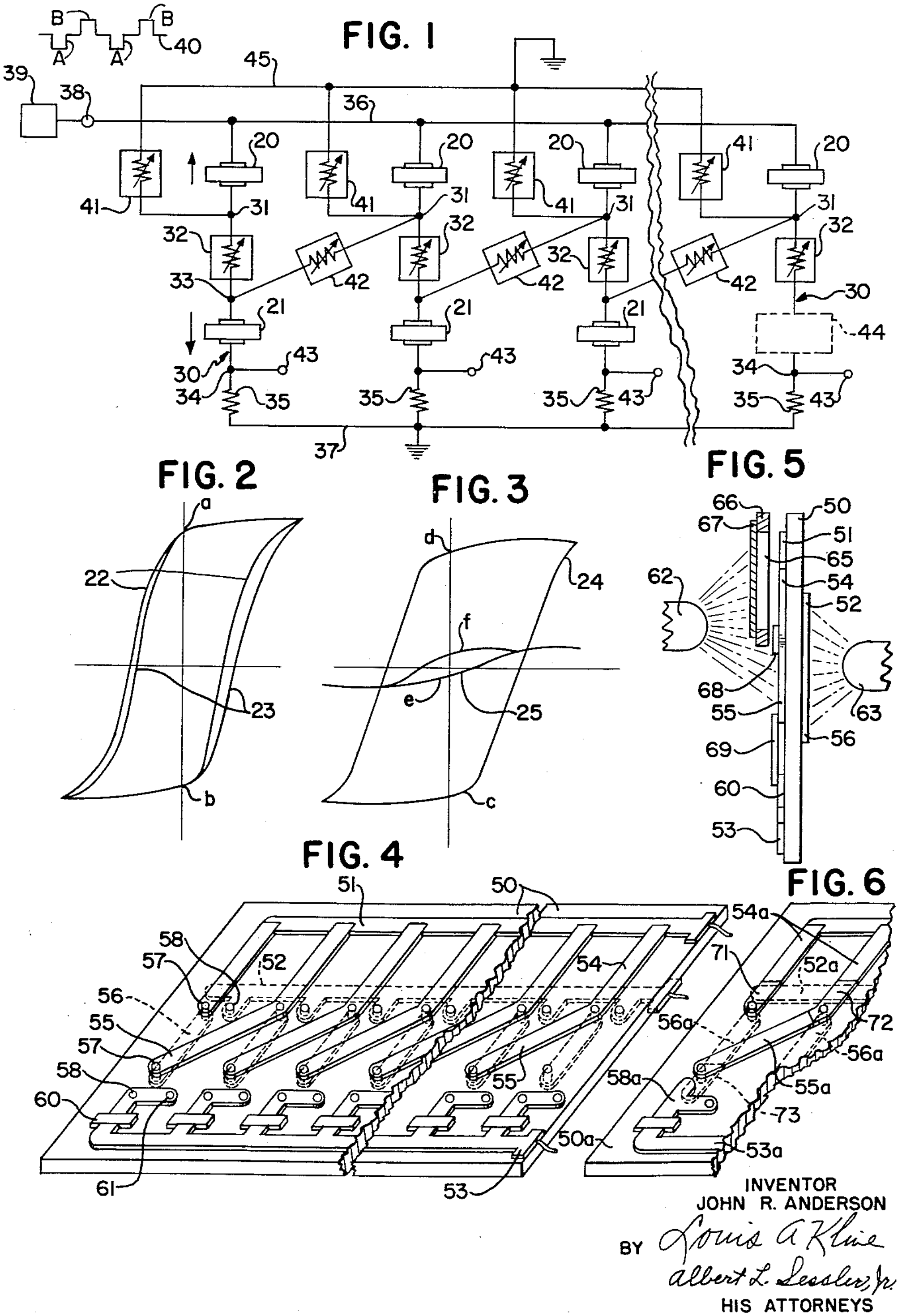
FIG. 1 is a diagram of a shift register circuit constructed in accordance with this invention.
FIGS. 2 and 3 are graphs showing hysteresis loops for ferroelectric elements of the type utilized in the device of FIG. 1, illustrating different conditions of polarization of these elements.
FIG. 4 is a perspective view showing one form in which the shift register of the present invention could be fabricated.
FIG. 5 is a diagrammatic view showing one manner in which the photoconductive elements of a shift register, such as that shown in FIG. 4, may be illuminated.
FIG. 6 is a fragmentary view showing an alternate construction of the shift register.

Referring now to the drawings, the ferroelectric elements utilized in the shift register of FIG. 1 are shown there in the form of capacitors, with the ferroelectric material, such as barium titanate, forming the dielectric.

Barium titanate is one of a group of materials, commonly termed ferroelectrics, which have substantially rectangular hysteresis loops. Hysteresis loops for barium titanate crystals of the type used in the present invention are illustrated in FIGS. 2 and 3, where the vertical axis represents electrical displacement or degree of polarization and the horizontal axis represents the voltage applied across the terminals of the ferroelectric elements, this voltage bearing a proportional relation to the electrical field strength.

The hysteresis loops for two individual ferroelectric elements, such as might be connected in series relationship in the device of FIG. 1, are shown in FIG. 2, where the loop 22 may be for one of said elements and the loop 23 for the other. Points *a* and *b* on the loops 22 and 23 represent stable states of polarization, and the ferroelectric elements, when placed in either of these states by application of the required electrical field across the terminals thereof, will remain in such state for a considerable period without requiring application of energy from an external source for maintenance of the field.

With regard to FIG. 3, the two loops shown there represent resultant hysteresis loops obtained from the combination of the two ferroelectric elements under different conditions of polarization. When both ferroelectric elements are polarized in the same direction, the loop 24 of FIG. 3, in which points *c* and *d* represent stable states of polarization, is obtained. The area of loop 24 is substantially greater than the area of either of the loops 22 or 23 and is approximately that which would be derived from a ferroelectric element having about twice the thickness of an element having a loop such as 22 or 23. Polarization of the ferroelectric elements in opposite directions results in a loop such as that shown at 25 in FIG. 3, in which points *e* and *f* represent stable states of polarization. This loop approaches a straight line, and, if these two elements were identical, the loop would be a straight line, since the changes in charges on the two oppositely-polarized ferroelectric elements, when a voltage is applied to the two in series, cancel each other. As a practical matter, absolute matching of two ferroelectric elements cannot be obtained, but an approximate matching is sufficient for elements used in devices constructed according to the teaching of this invention.

Since the heights of the hysteresis loops of FIG. 3 are proportional to the effective resultant polarization of the combination of the two ferroelectric elements whose characteristic curves appear in FIGS. 2 and 3, it is apparent that the change in polarization in going from the stable state *c* to the stable state *d* on the loop 24 is much greater than the change in polarization in going from the stable state *e* to the stable state *f* on the loop 25. Therefore, it will be seen that these two elements, when polarized in the same direction, as represented by the loop 24, will produce a much larger charge when both are switched from one state to the other than any charge which may be produced by any switching which can take place when the two elements are polarized in opposite directions, as represented by the loop 25. When the initial polarizations of both of the ferroelectric elements are in a direction opposing an applied voltage, they will both be switched by a sensing pulse. However, when the initial polarizations of the two ferroelectric elements are opposing, neither of the elments will be effectively switched by applying voltages of either polarity. These phenomena are utilized in the shift register of the present invention.

A plurality of pairs of ferroelectric elements 20 and 21, the number of pairs being one less than the number of stages desired, are utilized in the shift register of FIG. 1, but for convenience of illustration and description, only three pairs of ferroelectric elements 20 and 21 are actually shown in this figure. It will be realized that a shift register of this type may be made having any desired number of stages. It will be noted that the final stage in the shift register of FIG. 1 has only one ferroelectric element 20 rather than a pair of elements, for reasons which will be subsequently described.

Each pair of ferroelectric elements 20 and 21 is included in a circuit path 30, which includes, in series arrangement, the ferroelectric element 20, a point 31, a photoconductive cell 32, a point 33, the ferroelectric element 21, a point 34, and a resistor 35, said path extending between a first common 36 and a second common 37.

The common 36 is connected over a terminal 38 to a signal-generating means shown diagrammatically at 39, capable of producing a signal which may have a wave form such as that shown at 40 in FIG. 1. The common 37 is connected to a base reference potential, shown here as ground.

The point 31 on each path 30 is connected over a photoconductive cell 41 to a common 45, which in turn is connected to a base reference potential, shown here as ground. Also, on all but the first path 30 of the shift register, the point 31 is connected to the point 33 of the preceding path 30 over a photoconductive cell 42.

Connected to the point 34 on each path is an output terminal 43, from which an output signal may be taken to determine the contents of each stage of the shift register at a particular time.

As has been stated previously, on the rightmost path 30 in the register shown in FIG. 1, which path represents the highest stage of the register, only one ferroelectric element, the element 20, is present. No second ferroelectric element is used in this stage, since the second, or lower, ferroelectric element 21 of each of the other pairs of elements serves a delay or transfer function in this shift register, and no such function is required in connection with the final stage of the shift register.

A box 44 is shown in dashed lines in the path 30 for the highest stage of the shift register, said box occupying the position which the second ferroelectric element occupies in other stages of the register. As has been mentioned, where the device of FIG. 1 is used as a shift register, the point 34 on path 30 for the highest stage may be directly connected to the photoconductive cell 32, but when the device of FIG. 1 is used as a ring counter, the final stage is of the same construction as the other stages, and a ferroelectric element similar to the elements 21 is utilized in the position of the box 44. In such a case, a connection is also provided from a point between the photoconductive cell 32 and the second ferroelectric element located where the box 44 is shown, to the point 31 of the first stage of the shift register, over a photoconductive cell similar to the cells 42. Information is then shifted from the final stage to the first stage by appropriate impulses, so that the device of FIG. 1 functions as a counter.

As has been mentioned, the ferroelectric elements 20 and 21 used in the shift register of FIG. 1 are bistable in nature and therefore lend themselves very well to storage of information using the binary code. Accordingly, one state of each of the elements 20 and 21 may represent a zero in the binary notation, while the other state will then represent a binary one.

In operation of the device of FIG. 1, a train of impulses from the generator 39 is applied over the terminal 38 to the common 36, and thence to the various ferroelectric elements over the paths 30. It will be noted that the negative excursions of the wave form 40 are designated A, and the positive excursions of this wave form are designated B. Pulses of light are applied to the photoconductive cells 42 and 32, respectively, in timed coincidence with the negative and positive excursions A and B of the wave form 40. These light pulses may be supplied from any suitable source, such as electroluminescent elements or neon glow tubes, which are operated by, or in timing with, the negative and positive excursions A and B of the wave form 40.

In addition to the photoconductive cells 32 and 42, the photoconductive cells 41 are associated with the register of FIG. 1 in the manner previously described. These cells function as input means, and enable parallel inputs to the various stages of the shift register of FIG. 1. These inputs are timed to take place in coincidence with the A excursions of the wave form 40, and may be produced by selectively-operable electroluminescent cells or neon glow tubes.

As is well known, photoconductive materials possess the property of changing their electrical resistance in response to changes in radiation of certain wave lengths which impinge on them. One material frequently used for photoconductive cells of the type shown herein is cadmium sulfide, which has a high electrical resistance when not illuminated by radiation of suitable wave lengths, and which has a relatively low resistance when it is so illuminated. The photoconductive cells of the register of FIG. 1 therefore act as switches which are open when the cells are dark and which are closed when the cells are illuminated.

A typical operation of the shift register of FIG. 1 will now be described. All of the ferroelectric elements 20 and 21 are first set so that the direction of polarization of the elements 20 is opposite to the direction of polarization of the elements 21, as indicated by the dipole direction arrows adjacent the elements in FIG. 1. This is accomplished by operation of the generator 39 to produce a signal of wave form 40, and by corresponding illumination of the photoconductive cells 32 and 42 according to the timing arrangement previously described. Such operation will be effective to polarize the ferroelectric elements 20 and 21 of each stage in opposite directions, if repeated a sufficient number of times.

For example, let it be assumed that the elements 20 and 21 of the first, or leftmost, stage of the register of FIG. 1 are polarized in opposite directions in the manner indicated by the arrows, and the elements 20 and 21 in the remaining stages are polarized in the same direction with respect to each other, with the dipole direction arrows pointing upward. The next A excursion of the signal from the generator 39 having wave form 40 will then cause the element 21 of the second stage and the element 20 of the third stage, to which it is coupled at this time over an illuminated photoconductive cell 42, to be switched so that their direction of polarization is downward. The direction of the element 20 of the second stage remains upward, since it is coupled over the illuminated photoconductive cell 42 to the element 21 of the first stage, which element is polarized in an opposite direction, thus preventing switching of this coupled pair, since, as has been stated, two series connected ferroelectric elements will not switch from one state to the other in response to an applied pulse when they are polarized in opposite directions.

On the next B excursion of the signal of wave form 40, the elements 20 and 21 of each path 30 will effectively be connected by illumination of the photoconductive cell 32. The elements 20 and 21 in each of the first two stages are polarized in opposite directions at this time and cannot switch from one state to the other, although the elements 20 and 21 of the remaining stages will switch from one state to the other, since they are polarized in the same direction.

This process continues during successive A and B excursions of the signal represented by the wave form 40 until the elements 20 and 21 in all stages of the register, except the last stage, which has only one ferroelectric element, are polarized in opposite directions. The register is thus reset to zero and is prepared for data entry operations by means of the input photoconductive cells 41 for each stage.

Information may be entered into the shift register of FIG. 1 either serially, through the input photoconductive cell 41 of the first stage, or in parallel form by use of the photoconductive cells 41 associated with each of the stages of the register.

For example, let it be assumed that it is desired to enter a binary one into the first stage of the register. In order to do this, the photoconductive cell 41 associated with the first stage is illuminated during an A excursion of the signal from the generator 39. The effect of this is to connect point 31 of the path 30 for the first stage to ground, and thereby cause the ferroelectric element 20 for the first stage to be polarized in a direction opposite to that indicated by the arrow in FIG. 1. The polarization of the element 21 of the first stage is not affected by this action, and consequently, at the conclusion of the A excursion of the signal from the generator 39, the ferroelectric elements 20 and 21 of the first stage are polarized in the same direction.

Now, at the next B excursion of the wave form of the signal represented by wave form 40, both of the elements 20 and 21 of the first stage will be switched, so that both of these elements are polarized in a direction indicated by an upward-pointing arrow in FIG. 1.

Therefore, on the next following A excursion of the signal represented by wave form 40, the ferroelectric element 20 of the second stage will be connected to the ferroelectric element 21 of the first stage over the photoconductive element 42 between these two stages, which photoconductive element is illuminated at this time in the manner previously described, and these two elements 20 and 21, since they are polarized in the same direction, will be caused to switch by the A excursion to a direction of polarization which may be represented by a downward-pointing arrow in FIG. 1.

It may now be seen that the two ferroelectric elements 20 and 21 of the second stage are now polarized in the same direction, while the two ferroelectric elements 20 and 21 of the first stage are again polarized in opposite directions. This of course means that the binary one which was stored in the first stage of the shift register by switching of the ferroelectric element 20 of that stage, through illumination of the photoconductive cell 41, has been shifted to the second stage, and the first stage has been reset to a binary zero. In a like manner, a binary one entered into any stage of the shift register by illumination of the photoconductive cell 41 associated with such stage during an A excursion of the signal represented by wave form 40, will be shifted from stage to stage of the shift register and will ultimately appear on the last stage.

Output from the shift register may be taken from the terminal 43 of the last stage, and will be taken during a B excursion of the signal represented by the wave form 40. During a B excursion, the photoconductive cell 32 of the last stage is illuminated, so as to, in effect, complete a path which extends from the generator 39, through the ferroelectric element 20 of the last stage, the point 34, to which is connected the terminal 43, and the resistor 35, to ground. Since on the preceding A excursion, the ferroelectric element 20 of the last stage will have been switched so that it is polarized in a direction which may be indicated by an arrow pointing downward, the B excursion of the signal will be effective to switch the element 20 in the opposite direction, thus providing a potential across the resistor 35 which may be taken from the terminal 43 as an output signal to indicate the presence of a binary one. On the other hand, if the element 20 is polarized, at the time the B excursion of the signal commences, in a direction which may be indicated by an arrow pointing upward, the B excursion of the signal will be ineffective to switch the element 20, and no potential representative of the presence of a binary one will be produced at the terminal 43.

It may be noted that the shift register of FIG. 1 is not limited to a serial output, and that a parallel output simultaneously from all stages may be utilized, if desired. To this end, the resistor 35 and the terminal 43 have been provided for each stage and may be utilized during the B excursion of the signal represented by the wave form 40 to determine the presence or absence of a binary one in that stage. As is believed clear from the preceding description, when a binary one is present in any stage, the ferroelectric elements 20 and 21 of that stage will be polarized in the same direction, while the presence of a binary zero in any stage will cause the elements 20 and 21 of that stage to be polarized in opposite directions. As has also been previously stated, the elements 20 and 21, when polarized in the same direction, produce a much larger charge when voltage is applied thereto than when they are polarized in opposite directions. This means that for a signal of given strength from the generator 39, a much larger voltage drop will be present across the resistor 35 of a given stage when the elements 20 and 21 are polarized in the same direction than when they are polarized in opposite directions. This voltage drop may be measured at terminal 43 of any or all stages of the shift register and will thus indicate, as regards each stage, whether a binary one or a binary zero is stored therein.

It will thus be seen that an extremely versatile shift register has been provided in which either parallel or serial inputs and parallel or serial outputs may be provided, and which utilizes "solid state" elements exclusively.

The device of FIG. 1 may also be used as a ring counter, if desired, by substituting a ferroelectric element 21 for the box 44 in the last stage of said register, and by providing a connection from a point between the photoconductive cell 32 and the ferroelectric element 21 in the last stage, over a photoconductive cell similar to the cells 42, to the point 31 of the first stage of the shift register. Information which is shifted into the last stage of the register will then be shifted directly back to the first stage, rather than being lost. This will enable the register of FIG. 1 to be used as a ring counter in a manner which is well known to those skilled in the art. In the event that the register of FIG. 1 is used as a ring counter, a switch means should be provided in the connection between the last stage and the first stage, or between some other two stages, to temporarily disable one of the inter-stage connections so that reset may be effected without difficulty when desired.

One of the advantages of a shift register made according to the teaching of the present invention is that it lends itself very readily to simple and inexpensive fabrication techniques. One example of the manner in which such a register may be fabricated is shown in FIG. 4. A base member 50, having insulating and light-shielding properties, is provided, on which conductors, resistors, and photoconductive cells may be deposited, printed, or plated according to currently known techniques. As shown in FIG. 4, electrical conductors 51, 52, and 53 have been provided on the base 50, and photoconductive cells comprising the elements 54 and 55 on the visible side of the base and 56 on the back side of the base have also been laid down in the desired arrangement. Pairs of terminals 57 and 58 have been provided in association with the conductors and the photoconductive cells and are adapted to receive ferroelectric elements, which may conveniently consist of barium titanate crystals to which the proper connectors have been added for engagement with the terminals 57 and 58. Resistors 60 and output terminals 61 complete the fabricated register of FIG. 4.

All of the photoconductive cells on one side of the base 50 are those which will be illuminated in timed coincidence with an A excursion of the signal represented by wave form 40, while all of the conductors on the opposite side of the base are those which will be illuminated in timed coincidence with a B excursion of the signal represented by the wave form C. Since the base 50, as previously mentioned, acts as a light shield, the two sets of photoconductive elements are effectively isolated from each other.

This is shown diagrammatically in FIG. 5, where the photoconductive cells 55 and 56 on opposite sides of the base 50 are illuminated by light sources 62 and 63, which pulse in timed coincidence with a A and B excursions, respectively, of the wave form 40 for switching of ferroelectric elements 68 and 69. Isolation of certain of the photoconductive cells on one side of the base 50 from others on the same side such as, for example, may be necessary with the input photoconductive cells 41 of FIG. 1 for the various stages, can be achieved either by using individual sources of illumination and shielding the photoconductive cells on a given side from each other, or can be achieved by using a single source of illumination and providing masking means which selectively admit illumination only to the desired photoconductive cells, while the non-selected cells remain in a dark state. In FIG. 5, the photoconductive cells 54, which are shown as fabricated integrally with the cells 55, are illuminated selectively by the light source 62, which acts through apertures 65 in a mask 66, said apertures being capable of being closed by shutters 67, so that only selected cells 54 are illuminated.

FIG. 6 shows an alternate type of construction of the shift register of the present invention. In this embodiment, the base member **50*a* is made from a slab of single crystal ferroelectric, or a ceramic or plastic ferroelectric material, and the conductors, photoconductors, resistors, etc., are plated or deposited directly on this base member to form a unit similar to that shown in FIG. 4. Member 71, made of conductive material, is electrically connected to both of the photoconductive cells 54*a* and 56*a*. In a similar manner, member 72, also made of conductive material, is electrically connected to both of the photoconductors 54*a* and 55*a*, and member 73, also made from a conductive material, is electrically connected to both of the photoconductive cells 55*a* and 56*a*. The members 71 and 72 are so positioned, on one side of the base member 50*a*, with respect to the conductor 52*a*, on the other side of the base member 50*a*, that the volumes of the base member 50*a* between the members 71 and 52*a* and between the members 72 and 52*a* form ferroelectric elements which may be polarized in either of two states, and which may be used for storage purposes in the manner described in connection with the element 20 of FIG. 1. In a similar manner, the volume of the base member 50*a* between the member 73 and an extension 58*a* of the conductor 53*a* forms a ferroelectric element which may be polarized in either of two directions, and used for storage purposes in the manner described in connection with the element 21** of FIG. 1. The structure of FIG. 6 has the advantage of added compactness and eliminates the need for separate ferroelectric elements, and also eliminates the added manufacturing steps needed to assemble such elements to the unit.

While the forms of the invention illustrated and described herein are particularly adapted to fulfill the objects aforesaid, it is to be understood that other and further modifications within the scope of the following claims may be made without departing from the spirit of the invention.

What is claimed is:

1. A sequentially operable device comprising, in combination, a plurality of stages, each stage including a pair of bistable ferroelectric elements; first photoconductive switching means coupling the pair of ferroelectric elements in each stage; second photoconductive switching means coupling the ferroelectric elements of adjacent stages; input photoconductive switching means for each stage to enable information to be stored in the ferroelectric elements of the various stages of said device by causing one of the ferroelectric elements of selected stages to be switched from one state to the other; signal-generating means for generating a shifting signal having a regular wave form which includes both positive and negative excursions and for applying the shifting signal to the plurality of stages; first control means operating in timed coincidence with one of said excursions of the wave form produced by the signal-generating means to illuminate the first photoconductive switching means simultaneously with said excursion and thus vary the impedance thereof to apply the shifting signal to a first combination of the ferroelectric elements; second control means operating in timed coincidence with the other of the excursions of the wave form produced by the signal-generating means to illuminate the second photoconductive means simultaneously with said excursion to vary the impedance thereof to apply the shifting signal to a second combination of the ferroelectric elements; and input control means to control the illumination of selected input photoconductive switching means for storage of information in selected stages, the sequentially operable device being thus capable of storing information by changing the state of a ferroelectric element of a given stage, and being capable of shifting said stored information from one stage of the device to the next by switching the ferroelectric elements from one state to the other in the various stages by application of signals from the signal generating means over paths provided by varying the impedance of the first and second photoconductive switching means.

2. A sequentially operable device comprising, in combination, first and second paths connected in parallel relationship between a signal generating means and a base reference potential, each path including in series relationship a first ferroelectric element, a first photoconductive cell, and a second ferroelectric element; a third path including a second photoconductive cell and extending from the junction in the first path of the first photoconductive cell and the second ferroelectric element to the junction in the second path of the first ferroelectric element and the first photoconductive cell; information input means including a third photoconductive cell for each of the first and second paths connected to a point on each of the first and second paths between the first ferroelectric element and the first photoconductive cell and also connected to the base reference potential; signal generating means for generating shifting signals; control means for selectively controlling the impedance of the third photoconductive cells to enter information into the sequentially operable device by alteration of the potential across the first ferroelectric element in a selected path to cause said element to change from one stable state to the other; and further control means for controlling the impedance of the first and second photoconductive cells in timed coincidence with predetermined portions of the shift signals to cause said shift signals to be applied to the ferroelectric elements over the first and second paths during one portion of the shift signal, and to the ferroelectric elements over the third path during another portion of the shift signal, the shift signals being effective to switch both of the ferroelectric elements in a path to which said signals are applied from one state to the other when both of said elements are initially in the same state, thus enabling the shifting of information which has been entered into the device from one element to another.

3. A sequentially operable device comprising, in combination, a plurality of stages, each stage including a pair of bistable ferroelectric elements; first photoconductive switching means for selectively coupling the pair of ferroelectric elements in each stage at one time for simultaneous switching from one state to the other of said elements; second photoconductive means for coupling the ferroelectric elements of adjacent stages at another time for simultaneous switching from one state to another of these elements; input photoconductive means to enable information to be stored in the ferroelectric elements of the various stages of said device by causing one of the ferroelectric elements of selected stages to be switched from one state to the other; first radiation means operating in predetermined timed sequence for illuminating alternately the first-mentioned photoconductive switching means and the additional photoconductive switching means to cause said means to assume low resistance states when illuminated; input radiation means operating in a predetermined timed relationship with respect to the previously mentioned first radiation means for illuminating the input photoconductive means of selected stages to cause the storage of information in said stages; and shifting means operating in a timed coincidence with that of said first radiation means to shift the stored information from one stage to the next.

References Cited in the file of this patent

UNITED STATES PATENTS

| | | |
|---|---|---|
| 2,695,396 | Anderson | Nov. 23, 1954 |
| 2,839,738 | Wolfe | June 17, 1958 |
| 2,876,435 | Anderson | Mar. 3, 1959 |
| 2,885,656 | Wilson | May 5, 1959 |

OTHER REFERENCES

Principles of the Light Amplifier and Allied Devices, Journal Brit. IRE, March 1957.